Figure 1:
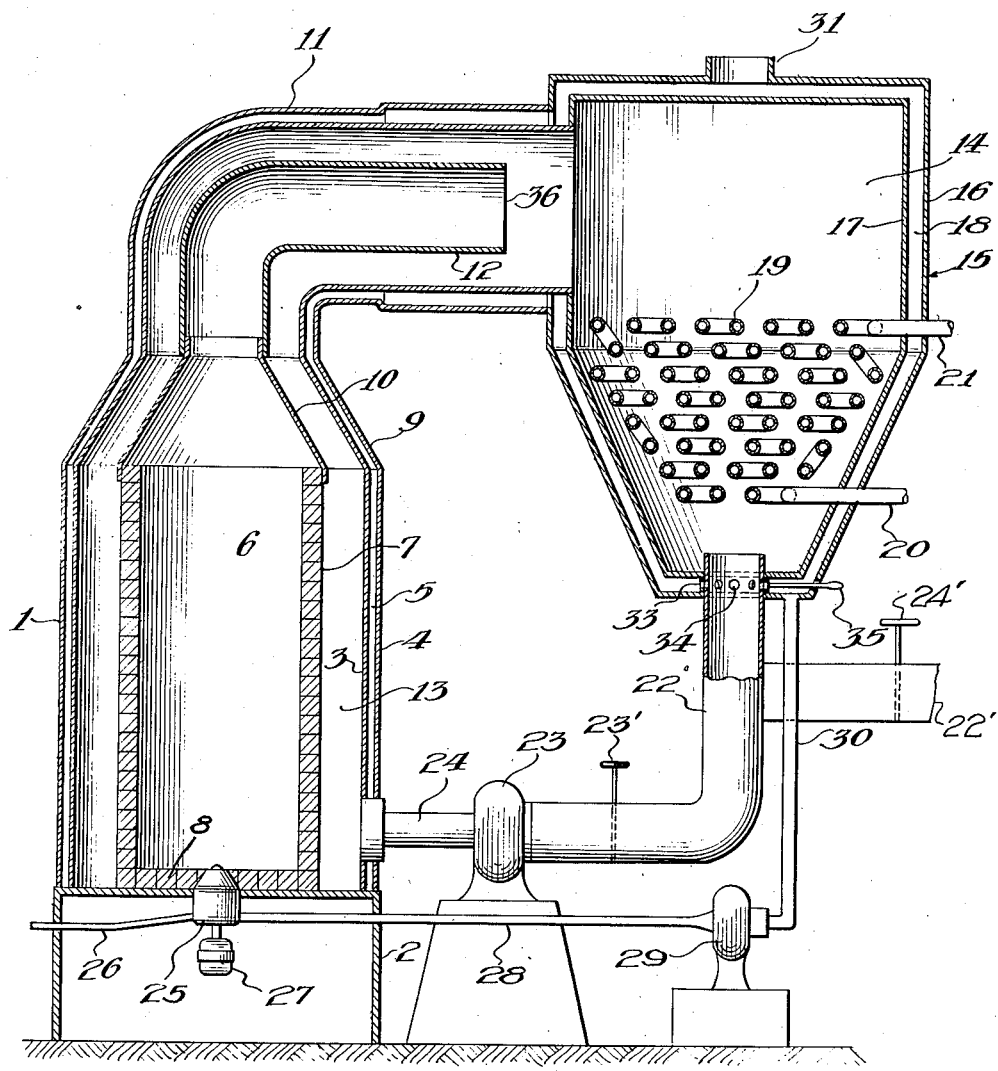

May 10, 1932.   N. G. DE RACHAT   1,857,364
FURNACE
Filed May 29, 1929

Inventor:
Nicholas G. de Rachat,
By Frank L. Belknap
Atty.

Patented May 10, 1932

1,857,364

UNITED STATES PATENT OFFICE

NICHOLAS G. DE RACHAT, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

FURNACE

Application filed May 29, 1929. Serial No. 366,915.

This invention relates to improvements in furnaces, and has for one of its principal objects the provision of an efficient method and means for heating various kinds of fluids.

More particularly, the present invention is applicable to oil stills, boilers, drying furnaces, steel treating furnaces, and the like, wherein materials can be heated with or without special containers.

The invention will be described and illustrated as applied to the heating of oil, but it is to be understood that this description and illustration are merely one example, and that the invention is applicable to the heating of other materials with equal facility.

The improvements of the present invention are more particularly directed to those types of furnaces wherein regulated amounts of spent gases of combustion are recirculated for tempering the fresh gases of combustion and preventing excessively high temperatures.

As a feature of the present invention, regulated amounts of the spent gases of combustion from the heating zone are removed and recirculated directly to the heating zone, passing in indirect heat conductive relationship with the fresh gases of combustion being generated in the combustion zone. Thus, all of the advantages of using recirculated spent gases of combustion for tempering purposes are accomplished without any of the disadvantages attendant upon the introduction of the recirculated spent gases directly into the combustion chamber. The recirculated spent gases may combine with the fresh gases of combustion at a point immediately prior to the admission of said fresh combustion gases into the heating zone or after said fresh gases have been admitted to the heating zone, the intention being that the spent gases are not brought into direct physical contact with the fresh combustion gases until the fresh combustion gases have been completely generated and are ready for introduction to the heating zone.

As another feature of the present invention, the entire furnace is insulated and jacketed. Access is provided for the introduction of fresh air into the said jacket whereby said air is preheated by the heat radiated from both the combustion chamber, transfer flues and heating chamber. Thus the air supplied to the burner in the combustion chamber has been preheated by utilizing the heat radiated from the furnace, which heat is normally lost.

As a still further feature of the invention, provision is made for the introduction of regulated amounts of air into the spent gases of combustion being recirculated, with the results hereinafter more particularly brought out.

Figure 2:
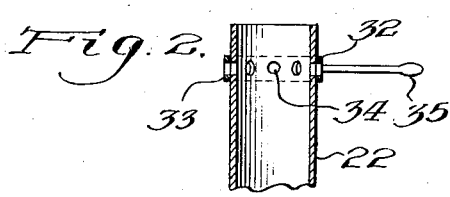

In the drawings:

Fig. 1 is an elevational view, partly in vertical section, of the furnace of the present invention; and Fig. 2 is a slightly enlarged sectional detail illustrating the valve or damper mounted upon the gas recirculation pipe for controlling the admission of air thereto.

Referring more in detail to the drawings, 1 indicates generally a furnace mounted on a suitable base 2. Although the furnace 1 is illustrated as being of circular cross-section, it is to be understood that the sectional contour may take any other desired form. Thus, it may be square, rectangular, oval, or the like. Preferably the walls of the furnace may be of a double construction, comprising, for instance, an inner shell 3 and an outer shell 4, spaced from each other to provide an air space 5 therebetween, the purpose of which will be hereinafter more fully described. The spaced shells 3 and 4 preferably comprise a suitable heat resisting metal.

Concentrically disposed within and spaced from the inner wall 3 is a combustion chamber 6 defined by the annular wall 7. Wall 7 is preferably composed of a refractory material having a high conductivity such, for instance, as silicon carbide, alumina, or other suitable heat resisting metals. The lower portion of the combustion chamber 8 may also be lined with a refractory material having the same characteristics.

The upper portions of the shells 3 and 4 taper inwardly as illustrated at 9, as does the top 10 of the combustion chamber 6. Upper portion 10 of combustion chamber 6 may preferably comprise a metal frustrum-like shell which may also be lined with refractory material, not shown.

The walls 3 and 4 continue upwardly from the upper portion of the conical taper 9, then turning at right angles to form a double walled right angle conduit 11. The inner conical top 10 has joined at its upper end a similar right angle conduit or elbow 12, which elbow is disposed concentrically within the conduit 11. An annular air space 13 is provided between the wall 7 and the inner shell 3, which space is also provided between the elements 9 and 10 and the conduits 11 and 12, the purpose of which will be hereinafter more fully described.

A heating zone 14, defined by a double walled structure 15, is positioned adjacent and in communication with the furnace 1, the double wall 15 comprising an outer shell 16 and a spaced inner shell 17, providing an air space 18 therebetween. The outer furnace wall 4 joins the outer heating zone shell 16, while the inner furnace wall 3 is connected to the inner shell 17, thus connecting the air spaces 5 and 18 of the combustion zone and heating zone, respectively.

A bank of tubes 19 having an inlet 20 and an outlet 21 are positioned in the lower portion of the heating zone 14, said tubes being adapted to be heated by the gases of combustion passing from the combustion chamber 6 through the conduit 12.

A conduit 22 is connected to the lower portion of the heating chamber 14 for the purpose of recirculating regulated portions of spent gases of combustion. For this purpose a blower 23 may be interposed in said conduit. A damper 23′ may be provided intermediate the length of conduit 22 for controlling the quantity of spent gas permitted to be recirculated. It is undersood that the blower 23 is illustrative only, and that any other suitable form of impeller or inducer may be provided for positively recirculating the proper amount of spent combustion gas. The discharge end of the blower is connected to the pipe 24, which latter opens into the air space 13 encircling combustion chamber 6.

A burner 25 may be positioned in the lower end of the combustion chamber, which burner may be of any conventional type adapted for burning oil, gas, pulverized material, or any other suitable fuel. The fuel may be brought to the burner from some external source of supply by means of a pipe line 26. A motor, steam turbine, or the like, 27 may be operatively connected with the burner 25 and may serve to finely divide or atomize the fuel before it is introduced to the combustion chamber.

Air for combustion is obtained through a line 28 connected to the high pressure side of a blower 29. A conduit 30 connects the suction side of blower 29 to the air space 18 provided in the walls of heating zone 14. An intake 31 may be provided at the top of the heating chamber 14 in the outer shell 16. Thus it can be readily seen that air for combustion is preheated in passing through the spaces 5 and 18, which spaces, in addition, also serve as a heat insulating means.

A stack 22′ of conventional type is suitably connected to the conduit 22 provided with a suitable damper 24′, whereby regulated amounts of spent gases of combustion may be removed from the chamber, as desired.

In operation, fuel is delivered to the burner 25 where it is mixed with air and ignited. The major combustion takes place in the combustion chamber 6, the products of combustion passing upwardly through the conduit 12 to the heating chamber 14. The hot gases pass downwardly through heating zone 14, heating the tube 19. Some of the spent gases will pass out through the stack, heretofore described but not shown, while regulated amounts thereof will be directed to the recirculating conduit 22, passing therethrough and through the blower 23 to the annular space 13 where, due to the heat radiated from the walls 7, 10 and 12, they are reheated and at the same time function to temper the high heat of the fresh products of combustion. The spent gases of combustion passing through the space 13 are mixed with the fresh gases of combustion issuing from conduit 12 at the point 36.

It should be stated here that it is the intention of the present invention that the spent gases being recirculated shall pass in indirect heat conductive relationship with the fresh combustion gases being generated in the combustion chamber, whereby to temper the high heat therein and absorb the heat radiated from the combustion chamber, mixing in direct physical contact with said fresh gases either in the heating chamber or at a point immediately adjacent the inlet to the heating chamber; that is, the exit 36 may be disposed within the heating chamber 14 or slightly outside thereof, as illustrated.

It may be found desirable to mix a quantity of air with the gases being recirculated for the purpose of cooling said spent gases, and at the same time providing a medium for the ready adsorption of heat radiated through the wall 7 from the combustion chamber 6, resulting of course in a more efficient tempering. Thus a damper is provided which may take the form of a collar 32 encircling the conduit 22 where the same passes through the space 18 between the shells 16 and 17. Collar 32 may be provided with a series of openings 33 adapted to register with corresponding openings 34 provided in the conduit 22. A handle 35 connected to the collar extends outwardly from the lower portion of chamber 15 and is adapted to bring the openings in the collar and conduit into registration or not, as desired, by obvious manipulation. Thus regulated quantities of air from the space 18 may be mixed with the recirculated gases passing downwardly through conduit 22.

The arrangement is such that a thermal siphon is produced. Fresh products of combustion leave the conduit 12 at point 36 and pass in an intermingled condition with the recirculated gases issuing from space 13 into the top of the heating chamber 14 wherein they pass downwardly in contact with the relatively cool surfaces of the tubes 19. The gases are cooled by the contact, become heavier, further tending to descend through the conduit 22. The recirculated gases are then passed to the annular space 13 where they are heated by the radiated heat from the refractories 7. Upon being heated, the gases tend to rise and thus again issue into the heating zone 14, the action of the gases passing opening 36 tending to draw out the fresh gases of combustion from conduit 12.

It is apparent that I have provided a very efficient furnace and method of heating, wherein the recirculated gases are passed in indirect heat conductive relationship with the fresh gases of combustion generated in the combustion chamber, and thereafter the fresh combustion gases and spent combustion gases are brought into direct physical contact in the heating chamber 14. In addition a thermal siphon action of the products of combustion is induced, assisting the circulation and recirculation of the heated gases.

I am aware that many modifications of my device may be constructed without departing from the spirit of the invention, and hence I do not wish to limit it to the specific structure shown and described, except as necessitated by the prior art.

I claim as my invention:

1. A heating device comprising a combustion chamber, a heating chamber, a conduit connecting the combustion chamber to the heating chamber, a plurality of walls surrounding said combustion chamber and said conduit and spaced therefrom to provide air spaces therebetween, one of said air spaces opening into the heating chamber the other space containing fresh preheated products for combustion and means for circulating the products of combustion from the combustion chamber through the heating chamber and back to said air space opening into the heating chamber.

2. A method of circulating gases in a heat transfer device comprising passing the fresh products of combustion from a combustion chamber to a heating chamber, removing regulated amounts of the spent products of combustion admixed with a limited quantity of free air passed in heat exchange relation with said heating chamber and passing the same adjacent the walls of the combustion chamber, and subsequently mixing the same with the fresh products of combustion in the heating chamber.

3. A heating device, comprising a combustion chamber, a heating chamber, a conduit connecting the combustion chamber with said heating chamber, a plurality of walls spaced apart adapted to pass air therebetween surrounding said combustion chamber, conduit and heating chamber, means for returning regulated portions of spent gases of combustion from the heating chamber to one of said spaces opening into the heating chamber, and means for introducing fresh preheated air from the other of said spaces to said return means.

4. A heating device, comprising a burner, a combustion chamber, for the burner a heating chamber in communication with said combustion chamber, a second chamber surrounding said combustion chamber and opening into the heating chamber, means for circulating spent gases of combustion from said heating chamber to said second chamber, a third chamber surrounding each of said aforementioned chambers, and means communicating with said last mentioned chamber to pass fresh preheated products for combustion to said burner.

In testimony whereof I affix my signature.

NICHOLAS G. DE RACHAT.